US012338010B1

(12) United States Patent
Kim

(10) Patent No.: US 12,338,010 B1
(45) Date of Patent: Jun. 24, 2025

(54) SYSTEM FOR ELECTRICALLY POWERED AERIAL PLATFORMS TO DRAW POWER FROM GROUND-BASED STATIONS

(71) Applicant: Wonny Kim, New York, NY (US)

(72) Inventor: Wonny Kim, New York, NY (US)

( * ) Notice: Subject to any disclaimer, the term of this patent is extended or adjusted under 35 U.S.C. 154(b) by 0 days.

(21) Appl. No.: 18/961,773

(22) Filed: Nov. 27, 2024

(51) Int. Cl.
*B64U 50/34* (2023.01)
*B60L 5/26* (2006.01)

(52) U.S. Cl.
CPC ............... *B64U 50/34* (2023.01); *B60L 5/26* (2013.01); *B60L 2200/10* (2013.01)

(58) Field of Classification Search
CPC .......... B60L 2200/10; B60L 5/26; B60L 5/24; B64U 50/34
See application file for complete search history.

(56) References Cited

U.S. PATENT DOCUMENTS

| | | | | |
|---|---|---|---|---|
| 3,730,312 | A * | 5/1973 | Leger | B60L 5/22 191/66 |
| 5,268,591 | A | 12/1993 | Fujimoto | |
| 7,714,536 | B1 * | 5/2010 | Silberg | B64U 80/25 320/108 |
| 8,678,150 | B2 | 3/2014 | Andre | |
| 9,170,582 | B2 | 10/2015 | Jensen et al. | |
| 9,377,779 | B2 | 6/2016 | Tojima et al. | |
| 9,878,787 | B2 * | 1/2018 | Chan | B60L 53/126 |
| 9,932,110 | B2 | 4/2018 | McNally | |
| 10,099,561 | B1 * | 10/2018 | Ananthanarayanan | B60L 53/126 |
| 10,186,348 | B2 * | 1/2019 | Davis | H01B 7/28 |
| 10,418,853 | B2 * | 9/2019 | Yang | H02J 50/05 |
| 10,577,099 | B2 * | 3/2020 | Akens | B64U 50/34 |
| 10,669,023 | B2 | 6/2020 | Heinen et al. | |
| 11,027,838 | B2 * | 6/2021 | Clemente | B64D 39/02 |
| 11,524,781 | B1 * | 12/2022 | Freeman | B64U 10/60 |
| 11,572,086 | B2 | 2/2023 | Fenny et al. | |
| 11,591,060 | B2 | 2/2023 | Azevedo et al. | |
| 2017/0015414 | A1 * | 1/2017 | Chan | B64U 10/14 |
| 2019/0154003 | A1 | 5/2019 | Nordstrom | |

(Continued)

FOREIGN PATENT DOCUMENTS

KR   102237589 B1 *  4/2021  ............. B64U 50/34

OTHER PUBLICATIONS

Wu, G., Dong, K., Xu, Z. et al. Pantograph-catenary electrical contact system of high-speed railways: recent progress, challenges, and outlooks. Rail. Eng. Science 30, 437-467 (2022). https://doi.org/10.1007/s40534-022-00281-2.

(Continued)

*Primary Examiner* — Zachary L Kuhfuss
*Assistant Examiner* — Cheng Lin
(74) *Attorney, Agent, or Firm* — Dunlap Bennett & Ludwig, PLLC

(57) ABSTRACT

A ground-connected power system for an aerial vehicle, wherein the ground-connected power system provides a conductor wire carried above-ground by supports fixed to the ground. The system further provides a current collector extending between an aerial end and a contact end, wherein the aerial end detachably connects to an underside of the aerial vehicle at an elevation above the conductor wire, and wherein the contact end electrically couples with the conductor wire so that a power component physically connected to the aerial vehicle is electrically powered by the conductor wire.

6 Claims, 3 Drawing Sheets

(56) References Cited

U.S. PATENT DOCUMENTS

| | | | |
|---|---|---|---|
| 2021/0253241 A1* | 8/2021 | Haran | B64U 10/60 |
| 2022/0274632 A1 | 9/2022 | Read et al. | |
| 2023/0026256 A1 | 1/2023 | Komatsu et al. | |
| 2023/0071247 A1 | 3/2023 | Zazzaro et al. | |
| 2023/0271701 A1* | 8/2023 | Abusalem | B60L 53/36 |
| | | | 244/17.17 |

OTHER PUBLICATIONS

Airbus' new eVTOL that aims to usher in an era of flying taxis just took its first public flight—take a look at CityAirbus—Impact Lab. (Aug. 6, 2020). Impactlab. https://www.impactlab.com/2020/08/06/airbus-new-evtol-that-aims-to-usher-in-an-era-of-flying-taxis-just-took-its-first-public-flight-take-a-look-at-cityairbus/.

* cited by examiner

US 12,338,010 B1

SYSTEM FOR ELECTRICALLY POWERED AERIAL PLATFORMS TO DRAW POWER FROM GROUND-BASED STATIONS

BACKGROUND OF THE INVENTION

The present invention relates to power systems for aerial platforms and, more particularly, to a catenary system for electrically powered aerial platforms to draw power from ground-based stations.

Current electrically powered aerial platforms lack sufficient energy storage capabilities to power onboard systems long enough to adequately transport materials and people in economically feasible manners. As a result, current air electrically powered air transportation lacks the ability to transport material and people over economically viable distances.

Tethered systems for small aerial systems exist, but those are not designed to enable an aerial platform to move beyond a fixed ground point.

Existing catenary systems and accessories are designed to power trolleybuses and trains but have not been contemplated for or configured for aerial platforms to draw power from ground-based stations.

As can be seen, there is a need for a catenary system for electrically powered aerial platforms to draw power from ground-based stations.

SUMMARY OF THE INVENTION

By drawing power through a catenary system, an electrically powered aerial platform can leverage electricity generated and transmitted by ground-based stations. This will improve the distance that aerial platforms can travel by providing a consistent power supply for onboard aerial systems, thereby enabling aerial platforms to be competitive transportation vehicles with ground-based transportation methods.

The present invention, in one embodiment of a plurality of embodiments, is a system that allows for flying trolleybuses, and no such flying trolleybuses or systems exist.

In one aspect of the present invention, a ground-connected power system for an aerial vehicle provides the following: a conductor wire carried above-ground by supports fixed to the ground; and a current collector extending between an aerial end and a contact end, wherein the aerial end detachably connects to an underside of the aerial vehicle at an elevation above the conductor wire, and wherein the contact end electrically couples with the conductor wire so that a power component physically connected to the aerial vehicle is electrically powered by the conductor wire.

In another aspect of the present invention, wherein the ground-connected power system for the aerial vehicle further provides wherein the contact end is urged upward against an underside of the conductor wire, wherein the current collector comprises a first arm and a second arm connected at a pivot point so that the aerial end can move vertically relative to the contact end, whereby the elevation above the contact wire of the aerial end is adjustable by one or more meters when the aerial end is connected to the aerial vehicle, wherein the contact end provides one or more contact strips having a lateral length of over a meter so that uninterrupted electrical coupling persists while the aerial vehicle moves laterally by up to a meter when the aerial end is connected to the aerial vehicle, wherein the first arm has a pivot end and a distal end, wherein the pivot end operatively associates with the pivot point, and wherein the distal end engages the aerial end of the current collector; a guide having a guide pivot end and a guide distal end; and a mechanical linkage between the distal end of the first arm and the guide distal end, wherein the mechanical linkage urges the first arm and the guide work in unison, and thereby urges the contact end of the current collector against the contact wire, wherein the mechanical linkage is configured to detach the current collector from the aerial vehicle.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Figure 1:
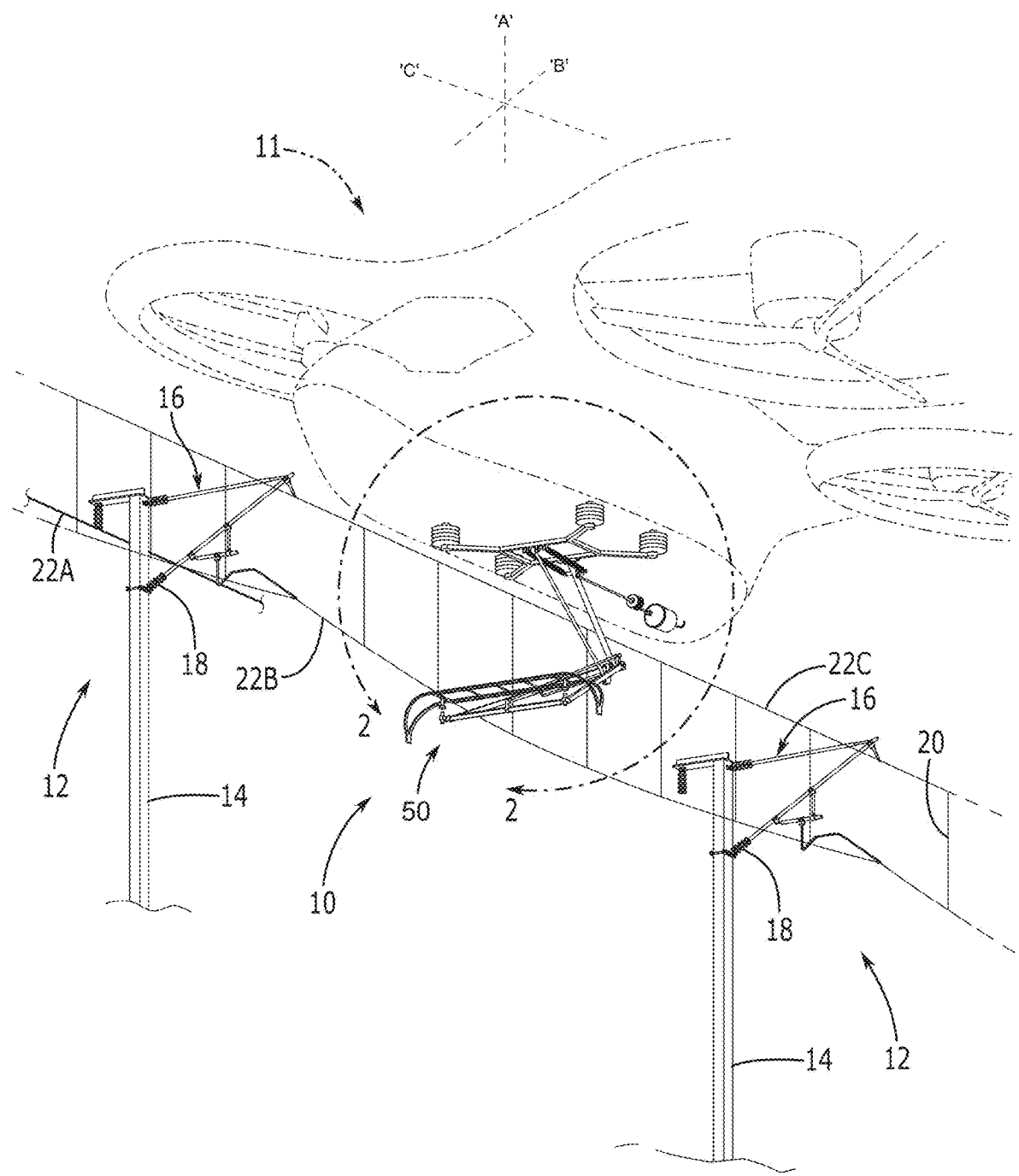
FIG. 1 is a perspective view of a catenary system for electrically powering aerial platforms, illustrating the vertical axis A (up and down), the lateral axis B (left and right), and the longitudinal axis C (forward and backward) of the aerial platform and present invention.
Figure 2:
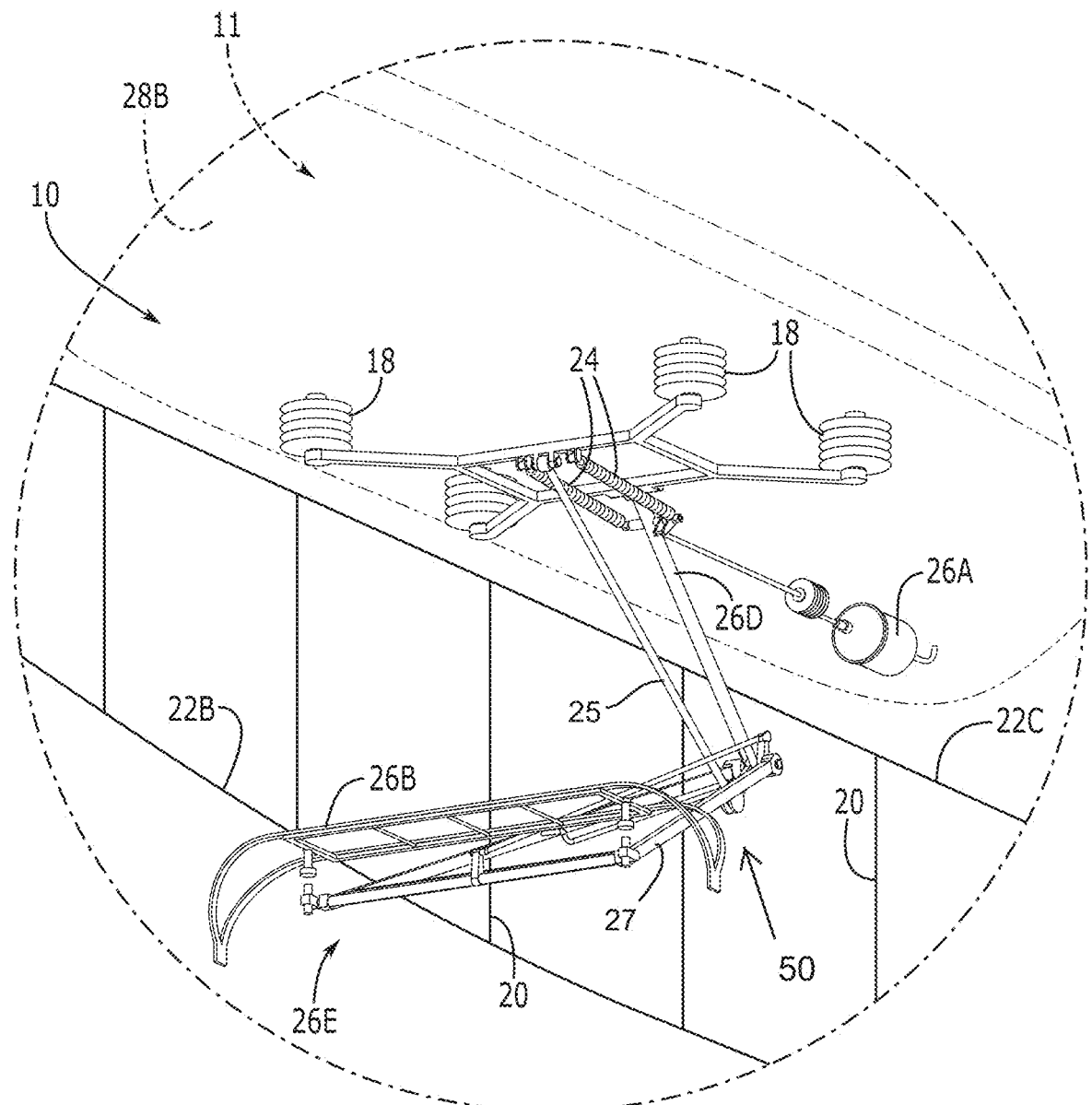
FIG. 2 is a bottom detail perspective view of an exemplary embodiment of the present invention, indicated along line 2-2 of FIG. 1.
Figure 3:
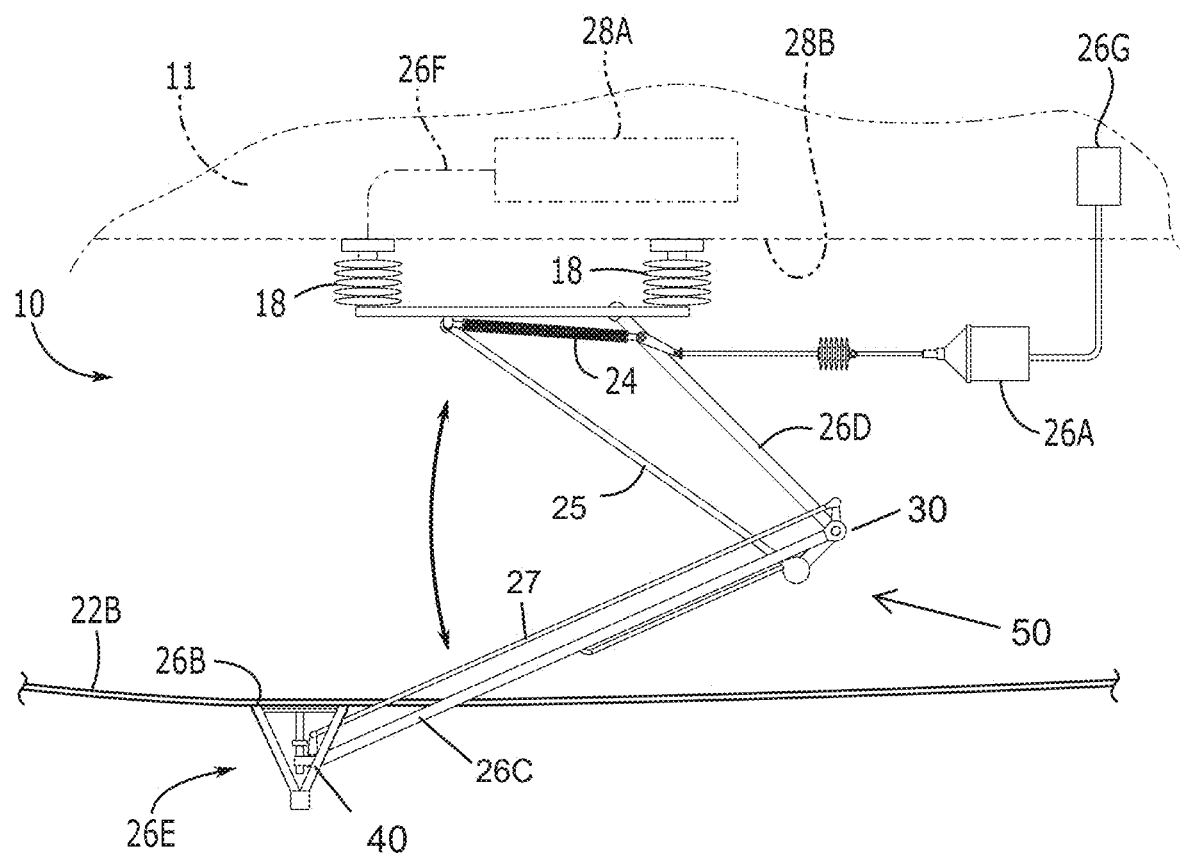
FIG. 3 is a detailed side elevation view of an exemplary embodiment of the present invention, indicated along line 2-2 of FIG. 1.

Referring to FIGS. 1 through 3, the present invention may include an aerial platform power system 10 embodying a systemic assembly where each component has a distinct yet interrelated function. The aerial platform power system 10 provides a conductor wire 22B to serve as the primary electrical conductor that operatively associates with a current collector 50 for the aerial platform/vehicle 11, whereby electrical power is transferred from a ground power station to a power component 28A residing in the aerial platform 11.

The conductor wire 22B may traverse a predetermined distance with the assistance of a series of support structures 14. Between two adjacent support structures, the conductor wire 22B may hang freely under its own weight, defining a catenary curve. Though, it should be noted that a true catenary curvature is not necessary required for the power system disclosed herein to function as contemplated. Put another way, the slack from the curvature of the conductor wire 22B may allow for maneuverability of the aerial platform while remaining connected to the system; however, if there is a design that enables a more rigid current collector 50 and its connection to the conductor wire 22B that too is contemplated by the disclosure of the present invention even though there may be no slack (required) in the conductor wire 22B.

The conductor wire 22B is dimensioned and adapted for direct interaction with a contact strip 26B of the current collector 50. A critical difference between the aerial platform power system 10 with an integrated pantograph and conventional catenary systems is the fact that the pantographic current collector 50 of the present invention provides upper and lower arm functionality reversed to enable an aerial platform disposed above the contact wire to electrically connect thereto, as opposed to how a trolleybus or train connects to the underside of one or more contact wires from underneath them.

Referring to FIG. 1, a messenger wire 22C may provide structural support to the conductor wire 22B to maintain a desired shape and tension of the conductor wire 22B. Conductor wire 22B shape and tension may further be maintained by way of spaced apart tensions members ('droppers') 20 that link the conductor wire 22B and the messenger wire 22C. The tension members 20 may have different lengths to facilitate a desired catenary curve. The tension members 20 may also distribute mechanical load to ensure the correct positioning of the catenary conductor wire 22B.

A ground support system 12 may also provide support structures 14 that includes poles and towers dimensioned and adapted to uphold the conductor wires 22B. In some embodiments, cantilever arms 16 may extend from the support structure 14 support the conductor wires 22B and messenger wires 22C in alignment and a desire elevation. To ensure electrical safety, insulators 18 may separate and connect cantilever arm 16 from its associated support structure 14. Section insulators 18 also segment the conductor wire 22B for maintenance ease and fault isolation.

Tensioning devices (not shown) may be configured to maintain the appropriate tension in the wires for the system's efficient operation. Grounding and bonding equipment (not shown) may provide a safety net against electrical hazards, enhancing system reliability. Tensioning devices and grounding and bonding equipment are established components of existing catenary systems.

The feeder cable/return wire 22A acts as the main arteries, channeling power from ground-based substations to the catenary system. Registration equipment (not shown) may be tasked with fine-tuning the catenary wire's position, ensuring optimal pantographic current collector 50 contact. Surge arresters and voltage limiters (not shown but known to those skilled in the art) may be provided to protect the aerial platform power system 10 from electrical surges and over-voltage, preserving infrastructure integrity. Lastly, junctions and crossings (not shown) may be provided to act as the complex nodes where tracks intersect or run parallel, ensuring seamless power continuity across the network. The circuit link is optionally completed through the feeder cable/return wire 22A.

Referring to FIGS. 2 and 3, the current collector 50 acts as a dynamic electrical and mechanical link between the mobile aerial platform 11 and the stationary aerial platform power system 10. The current collector 50 may be equipped with a first arm 26D and a pivotably connected second arm 26C, both integral for urging and maintaining contact with the catenary wire 22B. The collector head 26E forms the point of contact via a contact strip 26B that ensures efficient and consistent electrical conductivity with the curved catenary wire 22B.

Specifically, the contact strip 26B may include composite materials like carbon, graphite, or copper alloys, which are selected for their high conductivity, low wear rate, and ability to withstand high temperatures, wherein the composite materials may also be used to balance conductivity and durability. Contact strip 26B is engineered to resist wear from continuous friction with the catenary wire. Materials and designs are optimized to reduce the frequency of maintenance and replacement, increasing the overall efficiency of the system. Contact strip 26B may feature a specific shape, such as a slightly curved, bowed or grooved surface or slide plate, to maximize contact with the catenary wire while allowing smooth sliding motion. This design helps maintain consistent contact force and reduces arcing or sparking. Due to the high currents and friction involved, contact strip 26B is designed to dissipate heat efficiently, preventing overheating that could lead to degradation of the contact surface or damage to the pantograph. Contact strip 26B may include embedded sensors to monitor wear, temperature, and contact quality in real-time. These sensors help in predictive maintenance and optimizing contact performance. To manage the dynamic forces during high-speed travel, contact strip 26B may include integrated shock-absorbing features, like embedded elastomers or flexible mounting systems, to reduce mechanical stress and enhance contact stability. Anti-oxidation coatings may be applied to the contact strip 26B to prevent oxidation and corrosion, which can degrade performance over time. These coatings enhance the strip's longevity and maintain optimal electrical contact. The contact strip 26B may have adaptive features that allow them to adjust their performance based on environmental conditions, such as humidity, temperature, or the presence of contaminants. These design elements ensure the contact strip 26B functions reliably under the demanding conditions of a pantograph system, providing consistent electrical transfer while managing wear and operational stresses.

A pivot point 30 at the elbow, between the first arm 26D and the second arm 26C, allows the current collector 50 to be urged vertically, along the 'A' vertical axis, thereby conforming to varied heights of the conductor wire 22B as well as changing the altitudes of the aerial platform 11. Pivot point 30 allows for a vertical adjustment range of at least one meter and up to ten meters or more when significant altitude adjustments are necessary based on the terrain and operating environment. A typical range requirement would be between two to five meters to accommodate most variations due to terrain, wind-induced sway, and operational altitude changes of the aerial vehicle. The pivot point 30 also allows for the aerial platform 11 to move horizontally, enabling the aerial platform 11 to maneuver as needed.

The movement and operation of the current collector 50 are controlled by an operating mechanism 26G, which can be either pneumatically operation or spring-loaded, dictating the change in elevation along the conductor wire 22B. A first guide 25 and a coupled rod 27 further assist in the first arm 26D pivotably moving relative to the second arm 26C.

To mitigate vibrations and maintain stability during movement, dampers 20 may be incorporated into the design. Electrical insulation may be provided by insulators 21, crucial for safety and preventing electrical short circuits.

When needed, the compression springs 24 can release tension on the contact strip 26B to allow for the aerial platform 11 to disengage from the stationary aerial platform power system 10 and fly by drawing on power from its onboard power source 28A. Alternative to the current collector 50 disengaging from the stationary aerial platform catenary system 10, the aerial platform 11 can disengage from the current collector 50 at the head connector 40. The system can disengage from the stationary aerial platform power system 10 through two methods.

The first method involves selectively disengaging the contact strip 26B from the catenary wire by adjusting the tension control via sensors and automated mechanisms within the pantograph. Once disengaged, the aerial platform 11 maneuvers away using its flight controls, maintaining a safe distance from the catenary while still powered by its onboard systems. This controlled disengagement ensures that the aerial platform 11 can safely transition from connected to independent operation without abrupt movements, preserving the integrity of both the pantograph and the catenary system.

The second method involves an emergency release mechanism where the aerial platform 11 rapidly drops the entire pantographic current collector 50 from its body. This release is triggered by disconnecting the current collector 50 at key attachment points, such as the head connector 40, allowing the pantographic current collector 50 to fall away and fully disengage from the ground-based power system. This emergency drop is used in critical situations where immediate separation is necessary to protect the aerial platform or avoid damage.

The coherent movement of the current collector 50 is achieved through mechanical linkages 24 ensuring that the first arm 26D and guide 25 work in unison. The pivot point 30 provides a joint mechanism, allowing the current collector 50 to fold or unfold efficiently, as illustrated in FIG. 3. Since the first arm 26D and the guide 25 are operatively associated with the second arm 26C, the mechanical linkage 24 (which in some embodiments may be a compression springs) maintains and urges the necessary contact force between the contact strip 26B and the conductor wire 22B, ensuring a reliable electrical connection, by linking the first and second arms 26D and 26C. Finally, a cable connection 26F may serve as the conduit for electrical power from the current collector 50 to the aerial platform 11, completing the electrical connection between the aerial mobile unit and the ground-based power source. Each of these components is designed and coordinated to enable continuous power supply to the moving vehicle while accommodating its dynamic movements.

Furthermore, the aerial platform 11 houses an onboard power component 28A, which may include a transformer, battery, and the like. The transformer of the power component 28A adjusts voltage levels for compatibility with the platform's electrical systems, while the battery provides energy storage and backup. An electrical connection 26F exists between the onboard power component 28A and the underside 28B of the aerial platform 11, which conducts electrical power through the conductor wire 22B current collector 50.

In more advanced designs, an electric motor 26A may be employed for more precise control over the movement of the current collector 50, as opposed to the aerial platform 11 dragging the pathography. Additionally, sensors and the control systems 26G may be incorporated to monitor the current collector 50 performance, including contact force and position, enabling real-time adjustments for optimal operation.

This comprehensive system integrates the aerial platform power system 10 and an aerial platform 11 by way of the detachable current collector 50, each providing of several critical components that work in unison to provide an efficient and reliable power delivery solution for the aerial platform 11 from the ground-based aerial platform power system 10 while maintaining mobility and provides a safety buffer for operational stability or emergency landing should connection with the ground-based catenary system is disconnected.

The aerial platform 11 draws power from the aerial platform power system 10 and can maneuver in three dimensions. The current collector 50 traverses the conductor wire 22B of the aerial platform power system 10 as it is pulled or pushed by the aerial platform 11 in the longitudinal axis C (forward, backward) with room for lateral movement on the lateral axis B (left, right) because of the length/width of the contact strip 26B sliding plates, while the vertical axis A (up, down) is constrained by the current collector 50 yet with play because of the pivotable pantographic elements of the current collector 50. A potential option is for an electric motor 26A to drive the current collector 50 forward-backward, as well as drive precise control of the current collector 50 in the other two directions, removing the need for the aerial platform to drag the current collector 50. By consistently drawing power from the ground-based aerial platform power system 10, the aerial platform 11 should have much improved duration of operations and its ability to transport materials and people.

Regarding maintaining electrical contact during lateral movements (i.e., along axis B), the lateral movement can be caused by intentional maneuvers, wind drift, or navigational corrections. While the extended lateral length of the contact strip is a primary method for maintaining contact, connector 40 can also play a significant role if designed to allow lateral adjustment. Four design elements of the present invention can account for lateral movement. First, an extended lateral length of contact strip 26B designed with a lateral length exceeding the maximum expected lateral movement of the aerial vehicle, whereby this extended length ensures that even when the aerial platform moves laterally along the 'B' axis (left or right), the contact strip remains in contact with the conductor wire 22B. For example, if the aerial vehicle can move laterally up to one meter, the contact strip should have a lateral length exceeding this range, say between one and a half to two meters, to provide a safety margin. Second, via an articulated or swiveling connector mechanism (connector 40) incorporating an articulated joint or swivel mechanism at the connector 40 that allows the current collector to pivot or adjust laterally relative to the aerial vehicle. This flexibility enables the current collector to maintain alignment with the conductor wire even when the aerial platform changes its lateral position or orientation. Connector 40 might also incorporate a quick-release or safety mechanism to prevent damage in case of excessive lateral force, thereby reducing mechanical stress on the current collector and the aerial vehicle attachment point, enhancing durability and performance. Third, a spring-loaded or flexible mounting system utilizing springs or flexible materials in the mounting system can absorb and compensate for lateral movements, allowing the contact strip to adjust its position dynamically, maintaining consistent pressure and contact with the conductor wire, thereby improving contact reliability and reduces the risk of disconnection due to sudden movements. Fourth, guiding mechanisms implementing lateral guide rollers or pads that run along the sides of the conductor wire, providing guides to help keep the contact strip aligned with the conductor wire during lateral movements, thereby ensuring smooth operation and minimizes wear on the contact surfaces.

Moreover, the current collector 50 can take many forms, leveraging similar designs to existing pantographs, trolley poles, or flexible tethers used by smaller unmanned aerial systems. Similarly modular support structures may be incorporated for easy interchangeability or extension, enhancing adaptability to different track layouts and geographical conditions.

The first and second arms 26D and 26C of the current collector 50 may be interchangeable or length-adjustable for flexibility with varying catenary wire heights and aerial platform 11 altitudes. The collector head 26E and contact strip 26B may be combined into a single detachable unit for simplified maintenance and replacement.

The present invention may include an adaptive tensioning and registration system and integrate tensioning devices and registration equipment into an automated system, adjusting tension and wire position based on sensor feedback. Smart junctions and crossings equipment with advanced control systems for dynamic power flow management based on the aerial platform's position may be embodied in the present invention.

The present invention may include versatile aerial platform power management functionality along with modular, interchangeable transformers and batteries for the aerial platform to meet varying power needs and operation durations. Advanced control systems may selectively control and configure the operating mechanism, motor, and control systems into an integrated, intelligent system that adapts to environmental changes and operational demands.

Redundant systems for earthing and surge protection, especially in areas with electrical disturbances or harsh weather, may be implemented by the present invention.

Installation of ground catenary system components may include setting up support structures by erecting poles or towers at predetermined locations along the intended route, ensuring they are structurally sound and properly anchored.

Installation of the ground-based aerial platform power system 10 may include attaching the cantilever arms to the support structures to hold the wires. The messenger wire is installed above where the catenary wire will be, using tensioning devices to achieve the correct tension. This is followed by suspending the conductor wire 22B from the messenger wire using the tension members 20 ensuring it forms the correct catenary curve. The manufacturer may then suspend the return wire 22A from the messenger wire using tension members 20 as well. Section insulators may be positioned along the support structures and at required intervals to segment the conductor wire 22B. The manufacturer may connect feeder cables from substations or power sources to the aerial platform catenary system 10, and then install grounding and bonding equipment to ensure safety and system stability may be involved.

The set-up registration equipment to adjust and align the catenary wire and placement of surge arresters and voltage limiters at strategic points to protect the system from electrical surges is a task needed to be tackled in some embodiments. As is the establishment of junctions and crossings and specialized components at intersections or parallel track sections.

Installation and assembly of the current collector 50 includes operative association of the upper and lower arms, head, and contact strip, while ensuring the pivot is functional, the operating mechanism is in place, and dampers are installed for stability. Placement of insulators 18 on the current collector 50 to prevent electrical hazards is also a must. Operative association between the upper and lower arms ensures the mechanical linkages are properly connected for coordinated movement. The assembly of the current collector 50 requires the knuckle to allow for efficient folding and the springs maintain necessary contact force.

In some embodiments, attachment of a motor for precision control includes installation and coupling of necessary sensors and control systems for monitoring and adjustments.

Along the aerial platform 11, placement and installation of the transformer to adjust voltage levels and batteries for energy storage and as a backup power source are necessary in certain embodiments.

Then integration and safety testing and commissioning the system for operational use. Training and documentation are part and parcel maintaining a robust system.

Additionally, besides the transportation of materials and people, the present invention can be used for the following. Agricultural monitoring and management adapt as a real-time monitoring tool for crop health and soil conditions, utilizing continuous power for extensive data collection in agriculture—gathering real-time data on soil, crops, and environment using sophisticated sensors. Environmental monitoring and research transform into an environmental observation platform, monitoring ecosystems and air quality in sensitive areas with long-term data collection capabilities (e.g. measuring air quality). Serves as a mobile maintenance unit for the catenary system, power distribution grids, and power generation sites (e.g., wind farms and solar installations), leveraging its continuous power and aerial mobility. Acts as a mobile telecommunications hub, enhancing network coverage in remote or disaster-affected areas. Aerial surveillance and security, providing continuous surveillance over borders or critical infrastructures, equipped with advanced sensors and cameras. Efficiently tracks urban pollutants, offering extensive air quality monitoring across cities. Supply large-scale illumination for events or emergency situations, replacing the need for ground-based generators. Function as a stable platform for atmospheric research, studying weather patterns and cloud dynamics, benefiting meteorological studies. Emergency communications and service platform, providing a temporary communication network setup for disaster-struck areas, aiding in rescue operations and coordination, as well as an aerial fire engine to quickly respond to fire emergencies, deliver other required materials and goods during emergencies, or outfitted with sensitive sensors, beacon locators, and rescue drones, designed for efficient search-and-rescue missions.

Furthermore, the present invention excels in aerial reconnaissance and surveillance (e.g., high-resolution cameras, thermal imaging, and night vision), offering real-time intelligence for border monitoring and battlefield awareness. Its role extends to electronic warfare, effectively jamming enemy systems. Additionally, it aids in precision target acquisition and laser designation in combat zones. In search-and-rescue missions, it proves vital for locating survivors and assessing damages. The platform also serves as a drone carrier or launcher, supporting reconnaissance and unmanned aerial combat, highlighting its multifaceted military utility.

The present invention can provide a robotic platform designed for routine inspections and repairs of the catenary system as well as attached power generators (e.g., solar panels and wind turbines), enhancing efficiency and longevity.

The present invention can provide a portable, high-intensity lighting solution for events or emergencies.

The present invention can provide a compact array measuring urban pollutants and gases, providing data for urban planning and health policies.

The present invention can provide an integrated system for jamming enemy communications and radar, crucial for electronic warfare operations.

The present invention can provide an advanced target acquisition and laser designation, enabling precise guidance for munitions in combat scenarios.

The present invention can be outfitted with sensitive sensors, beacon locators, and rescue drones, designed for efficient search-and-rescue missions.

The present invention can provide an advanced target acquisition and laser designation control system for drone operations, suitable for reconnaissance, supply delivery, or combat support.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A ground-connected power system for an aerial vehicle, the system comprising:
    a conductor wire carried above-ground by supports fixed to the ground; and
    a current collector extending between an aerial end and a contact end, wherein the aerial end detachably connects to an underside of the aerial vehicle at an elevation above the conductor wire, and wherein the contact end electrically couples with the conductor wire so that a power component physically connected to the aerial vehicle is electrically powered by the conductor wire, wherein the contact end is urged upward against an underside of the conductor wire.

2. The system of claim 1, wherein the current collector comprises a first arm and a second arm connected at a pivot point so that the aerial end can move vertically relative to the contact end, whereby the elevation above the contact wire of the aerial end is adjustable by one or more meters when the aerial end is connected to the aerial vehicle.

3. The system of claim 2, wherein the contact end provides one or more contact strips having a lateral length of over a meter so that uninterrupted electrical coupling persists while the aerial vehicle moves laterally by up to a meter when the aerial end is connected to the aerial vehicle.

4. The system of claim 3, wherein the first arm has a pivot end and a distal end, wherein the pivot end operatively associates with the pivot point, and wherein the distal end engages the aerial end of the current collector;
    a guide having a guide pivot end and a guide distal end; and
    a mechanical linkage between the distal end of the first arm and the guide distal end, wherein the mechanical linkage urges the first arm and the guide work in unison, and thereby urges the contact end of the current collector against the contact wire.

5. The system of claim 4, wherein the mechanical linkage is configured to detach the current collector from the aerial vehicle.

6. The system of claim 5, wherein the aerial vehicle, when detached from the current collector, is configured to fly electrically powered via said power component with electrical power received from the conductor wire.

* * * * *